United States Patent [19]
Sokol

[11] Patent Number: 6,115,391
[45] Date of Patent: *Sep. 5, 2000

[54] METHOD AND APPARATUS FOR INTEGRATING MULTIPLE REPEATERS INTO A SINGLE COLLISION DOMAIN

[75] Inventor: Michael A. Sokol, Rancho Cordova, Calif.

[73] Assignee: Level One Communications, Inc., Sacramento, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/803,437

[22] Filed: Feb. 20, 1997

[51] Int. Cl.[7] ........................ H04L 12/413; H04L 12/43
[52] U.S. Cl. ............................................ 370/445; 370/438
[58] Field of Search ...................... 370/445, 447, 370/434, 438, 439, 501, 235, 502, 524, 433, 446, 104, 133, 279, 293, 449, 450, 451, 454, 459, 461, 462, 496; 340/425.1, 815.4, 825.06, 825.17

[56] References Cited

U.S. PATENT DOCUMENTS

| | | |
|---|---|---|
| 4,063,220 | 12/1977 | Metcalfe et al. . |
| 4,099,024 | 7/1978 | Boggs et al. . |
| 4,605,864 | 8/1986 | Varadarajan et al. . |
| 4,748,346 | 5/1988 | Emori . |
| 5,161,192 | 11/1992 | Carter et al. . |
| 5,177,788 | 1/1993 | Schanning et al. . |
| 5,345,447 | 9/1994 | Noel . |
| 5,499,242 | 3/1996 | Lee et al. ................................ 370/445 |
| 5,636,214 | 6/1997 | Kranzler et al. ........................ 370/445 |
| 5,648,959 | 7/1997 | Ilyadis et al. ........................... 370/445 |
| 5,740,174 | 4/1998 | Sommer ................................... 370/438 |
| 5,796,738 | 3/1995 | Scott et al. .............................. 370/401 |
| 6,023,476 | 1/1997 | Lo .......................................... 370/502 |

FOREIGN PATENT DOCUMENTS

| | | |
|---|---|---|
| 0 495 575 | 7/1992 | European Pat. Off. . |
| WO 96/41454 | 12/1996 | WIPO . |

OTHER PUBLICATIONS

Level One Communications, Inc., "LXT903 10Base–T Hub Transceiver", Preliminary Information Standard Product, Aug., 1990, pp. 1–16.

Saunders, Stephen, "No–Frills Hubs: Stack 'Em and Save", *Data Communications*, vol. 22, No. 17, Nov. 21, 1993, pp. 83–92.

Copy of International Search Report re counterpart Application No. PCT/US98/03055.

*Primary Examiner*—Chi H. Pham
*Assistant Examiner*—Steven Nguyen
*Attorney, Agent, or Firm*—Merchant & Gould P.C.

[57] ABSTRACT

A system for integrating multiple repeaters into a single collision domain employs both analog and digital circuitry to convey system-wide collision information to repeaters thereby allowing seamless integration of multiple repeaters into multiple hubs without requiring additional drivers or external glue logic. One signal line (CFSL) within each hub is used to aggregate collision information within the hub. Further, only one signal line (CFSS) is used to aggregate collision information between hubs. This latter signal line in conjunction with two intra-hub signal lines (COLZ and SNGLZ) distributes system-wide collision information to all of the repeaters in all of the hubs.

13 Claims, 4 Drawing Sheets

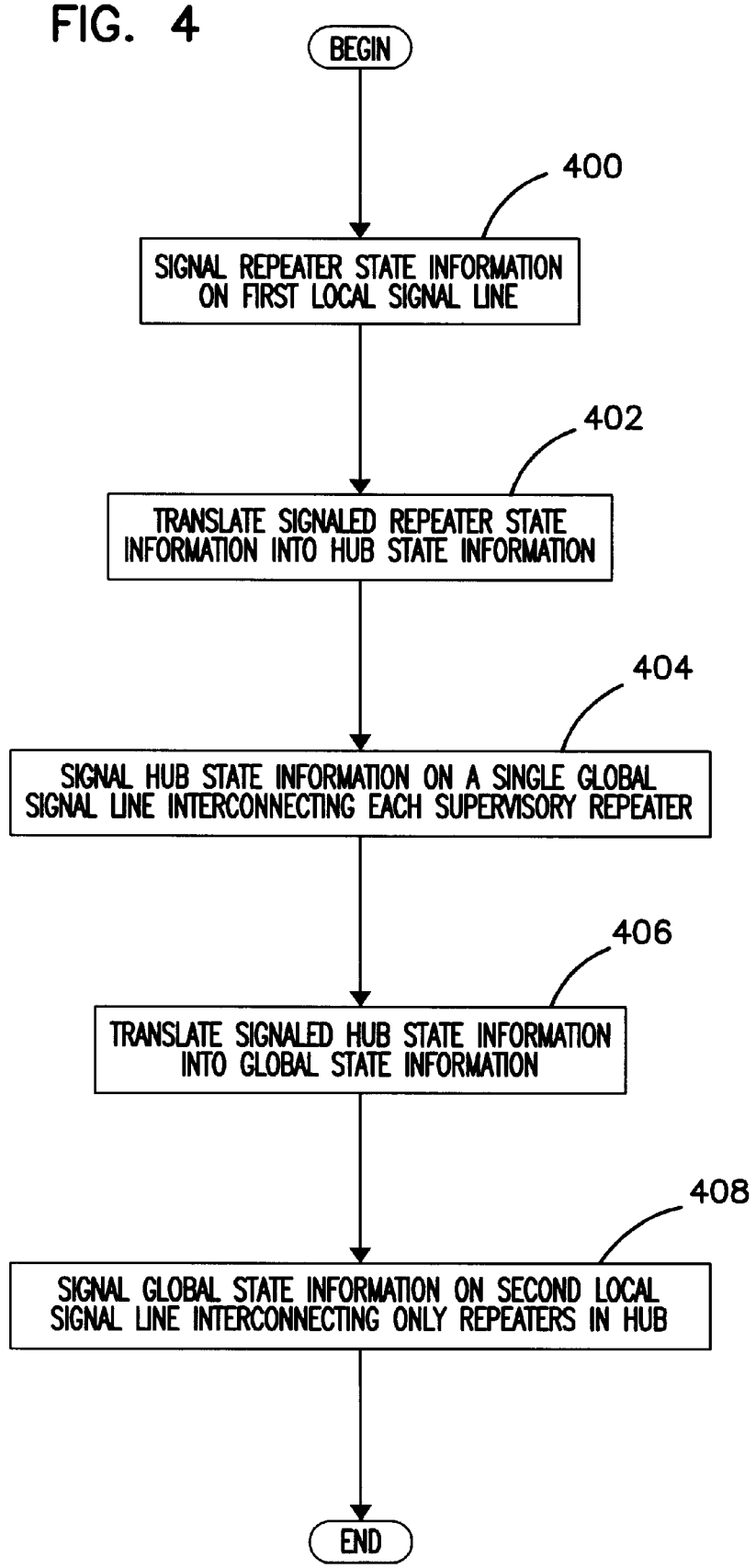

METHOD AND APPARATUS FOR INTEGRATING MULTIPLE REPEATERS INTO A SINGLE COLLISION DOMAIN

CROSS-REFERENCE TO RELATED APPLICATIONS

This application is related to:

application Ser. No. 08/770,949, entitled "METHOD AND APPARATUS EMPLOYING AN INVALID SYMBOL SECURITY JAM FOR COMMUNICATIONS NETWORK SECURITY," by Michael A. Sokol, and filed on Jan. 2, 1997 and assigned to the assignee of this application, issued as U.S. Pat. No. 5,961,646, issued on Oct. 5, 1999;

all of which applications are incorporated by reference herein.

BACKGROUND OF THE INVENTION

1. Field of the Invention

This invention relates generally systems and methods for transceiving information in a communications network, and more particularly to a method and apparatus for integrating multiple repeaters into a single collision domain without the need for external drivers and glue logic.

2. Description of Related Art

Recent advancements in the art of data communications have provided great strides in resource sharing amongst computer systems through the use of networks which offer reliable high-speed data channels. Networks allow versatility by defining a common standard for communication so that information independent of vendor equipment may be exchanged across user applications. The exchange of messages and data has been facilitated by the advent of Local and Metropolitan Area Networks. Remotely-located users communicate over the Local and Metropolitan Area Networks to access data and to communicate with other remote computer users. But as the popularity of networks has increased, so has the demand for performance. More sophisticated protocols are being established to meet this demand and are utilizing existing twisted pair wires in office buildings so that virtually all computer-literate users have access to resources with minimal expense.

As will be appreciated by those skilled in the art, communication networks and their operations can be described according to the Open Systems Interconnection (OSI) model which includes seven layers including application, presentation, session, transport, network, link, and physical layers. The OSI model was developed by the International Organization for Standardization (ISO) and is described in "The Basics Book of OSI and Network Management" by Motorola Codex from Addison-Wesley Publishing Company, Inc., 1993 (First Printing September 1992).

The primary standard for Local and Metropolitan Area Network technologies is governed by IEEE Std. 802. IEEE Std. 802 describes the relationship among the family of 802 standards and their relationship to the ISO OSI Basic Reference Model. Generally, IEEE Std. 802 prescribes the functional, electrical, and mechanical protocols, and the physical and data link layers for Local and Metropolitan Area Networks (LAN/MAN). The specification augments network principles, conforming to the ISO seven-layer model for OSI, commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

In such networks, nodes are connected to a bus and have multiple, or concurrent, access to the communications medium. However, a control technique is used to allow access to the communication medium and to resolve contention between the various users. Typically, a carrier sense, multiple access with collision detection (CSMA/CD) scheme is used. With CSMA/CD a node listens for activity and begins sending message packets when the node determines that no activity is occurring over the network. Sometimes simultaneous transmission by multiple nodes occurs. This results in collisions between the different message packets. When a node detects a collision, a signal is sent over the network to the other transmitting nodes. The affected nodes terminate their transmissions and probabilistically reschedule their next attempt to transmit. IEEE Std. 802.3 defines the standards for a bus utilizing CSMA/CD as a data link access method and is herein also incorporated by reference.

Typically, unshielded twisted pair cables or existing telephone wiring is used as the transmission medium to provide an economical solution to networking. However, the attenuation of signals transmitted over unshielded twisted pair cables increases as the distance between data terminal equipment becomes greater. Thus, repeaters are inserted in the twisted pair cables to facilitate greater distances.

While there are several LAN technologies in use today, Ethernet is by far the most popular. The definitions of the functions of an Ethernet repeater are contained in the IEEE 802.3 specification, which was incorporated by reference earlier. This standard defines attributes which can be used by a management function within an IEEE 802.3 Ethernet repeater to monitor network behavior.

In the past, repeaters were limited to a fixed number of ports thereby limiting the number of data channels. Accordingly, repeater manufacturers designed hardware which could be cascaded so that multiple repeater circuits could be integrated into a single hub. In order to allow multiple repeater circuits in a system to behave as a single hub, the repeaters must pass collision information in addition to routing data and clock signals. The collision information is passed between individual repeater circuits over an inter-repeater communication medium or backplane.

Wanting to further expand the number of ports that repeater circuitry can handle, repeater manufacturers now integrate multiple hubs so that the combination of hubs appears as a single large repeater. However, these multiple hub designs require external glue logic to distribute collision information among the hubs and the individual repeaters. There is a need, therefore, for a system that seamlessly integrates multiple repeaters into a single collision domain and which does not require external glue logic to implement a multiple hub design.

SUMMARY OF THE INVENTION

To overcome the limitations in the prior art described above, and to overcome other limitations that will become apparent upon reading and understanding the present specification, the present invention discloses a system that allows multiple repeaters to be grouped into multiple hubs and still operate in the same collision domain. The unique feature to the approach of this invention is the aggregation of collision information first at an intra-hub level and then at a system-wide, inter-hub level so as to reduce drive requirements and avoid the need for external glue logic.

The present invention discloses a method and apparatus for monitoring data flow in a communications network which allows multiple repeaters to be cascaded together and still operate in the same collision domain. The method begins with the step of signaling repeater state information from each repeater on a first signal line which interconnects only repeaters within each hub. Next, the signaled repeater state information from the first local signal line is translated into hub state information. Then, the hub state information is signaled to other hubs on a single global signal line interconnecting each hub. Next, the signaled hub state information is translated into global state information. Finally, the global state information is signaled on a second local signal line interconnecting only the repeaters within each hub.

The apparatus comprises a means for signaling repeater information from each of the repeaters on a local signal line and a means for translating the signaled information into hub state information. The apparatus further comprises a means for signaling the hub state information on a single global signal line interconnecting each supervisory repeater, means for translating the signaled hub state information into global state information, and for signaling the global state information on a second local signal line interconnecting only the repeaters within each hub.

This and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a flow chart depicting the method steps of the present invention.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
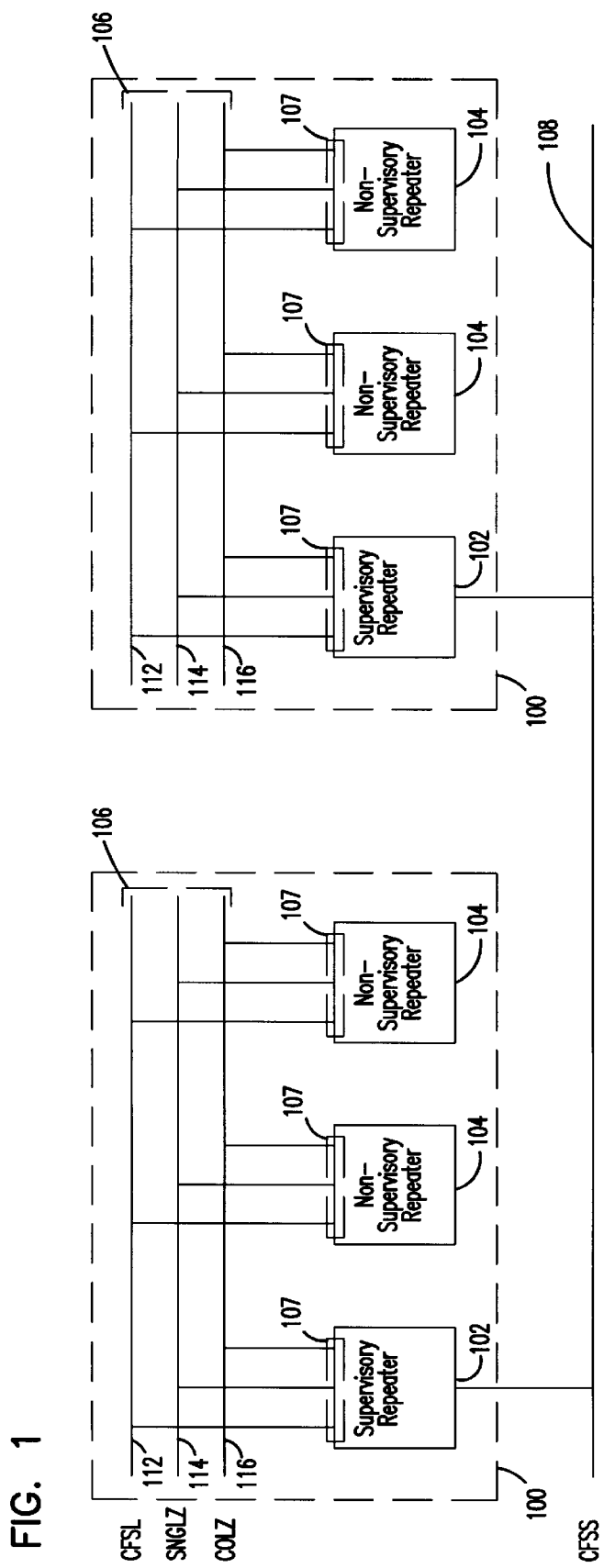
FIG. 1 is a system block diagram of a single collision domain comprising multiple hubs linked via a single inter-hub collision signal line.

FIG. 1 is a system block diagram of a single collision domain comprising multiple hubs having a plurality of repeaters linked via a single inter-hub collision signal line. In this exemplary embodiment, the collision domain comprises a plurality of hubs 100, each hub 100 having one supervisory repeater 102 and at least one non-supervisory repeater 104. Both the supervisory repeater 102 and the non-supervisory repeaters 104 in a hub 100 comprise ports 107 which are coupled to intra-hub signal lines 106 that interconnect only the repeaters 102 and 104 within that hub 100. Further, a Carrier Force Sense System (CFSS) signal line 108 interconnects the supervisory repeater 102 of each hub 100 to all of the other supervisory repeaters 102.

Each of the repeaters 102 and 104 may have multiple ports with which to receive/send data from/to Data Terminal Equipment (DTE) in the network. In addition, each of the repeaters 102 and 104 is coupled to an inter-repeater data bus that spans all of the hubs 100. If a repeater 102 or 104 receives data on one of its ports 107 and no other repeater 102 or 104 in any of the hubs 100 is receiving data on any port 107, the receiving repeater 102 or 104 sends the data it receives to its other ports as well as to the inter-repeater data bus. In turn, the other repeaters 102 and 104 in all of the hubs 100 send the data that they receive from the inter-repeater data bus to all of their respective ports.

The intra-hub signal lines 106 comprise a Carrier Force Sense Local (CFSL) signal line 112, a Single Driver (SNGLZ) signal line 114, and a Collision (COLZ) signal line 116. When a repeater 102 or 104 receives data on one of its ports, it sinks current from the CFSL signal line 112. As a result, the voltage on the CFSL signal line 112 drops to a lower level and from this lower voltage level, the supervisory repeater 102 within the hub 100 can determine that one repeater 102 or 104 in the hub 100 is receiving data.

If two or more repeaters 102 or 104 in a hub 100 receive data on one of their ports 107 at the same time, each of the receiving repeaters 102 or 104 sinks current from the CFSL signal line 112. Thus, the voltage on the CFSL signal line 112 drops to a lower level than if only one repeater 102 or 104 is receiving. From this lowest voltage level on the CFSL signal line 112, the supervisory repeater 102 within the hub 100 can determine that more than one repeater 102 or 104 in the hub 100 is receiving data. Similarly, a single repeater receiving data on two or more ports 107 can pull the voltage on the CFSL signal line 112 down by sinking current, indicating a data collision/contention.

Each supervisory repeater 102 sinks current from the CFSS signal line 108 in proportion to the number of repeaters 102 or 104 receiving data in the supervisory repeater's hub 100. As a result, if no repeater 102 or 104 among all of the hubs 100 is receiving data, the voltage on the CFSS signal line 108 remains at its highest level. If only one port 107 among all of the hubs 100 is receiving data, the voltage on the CFSS signal line 108 drops to a lower level. Finally, if more than one port 107 among all of the hubs 100 is receiving data, the voltage on the CFSS signal line 108 drops to its lowest level. Thus, the supervisory repeaters 102 can determine from the voltage level on the CFSS signal line 108 the number of ports 107 receiving data among all of the hubs 100.

After sensing the voltage level on the CFSS signal line 108, each supervisory repeater 102 drives the SNGLZ signal line 114 and the COLZ signal line 116 based on the voltage level on the CFSS signal line 108. If no repeater 102 or 104 among all of the hubs 100 is receiving data, the supervisory repeaters 102 do not assert the SNGLZ lines 114 and do not assert the COLZ signal lines 116. If only one repeater 102 or 104 among all of the hubs 100 is receiving data, the supervisory repeaters 102 assert the SNGLZ lines 114 but do not assert the COLZ signal lines 116. Finally, if more than one repeater 102 or 104 among all of the hubs 100 is receiving data, the supervisory repeaters 102 assert both the SNGLZ lines 114 and the COLZ signal lines 116.

Each non-supervisory repeater 104 can determine from the SNGLZ signal line 114 and the COLZ signal line 116 the number of repeaters 102 or 104 receiving data among all of the hubs 100. If a repeater 102 or 104 determines that one or more repeaters 102 or 104 among all of the hubs 100 are receiving data, the repeater 102 or 104 will stop sending data on the inter-repeater data bus and thereby avoid contention with the data that the receiving repeaters 102 or 104 are relaying to the inter-repeater data bus. Thus, the present invention allows seamless integration because the repeaters themselves require no external glue logic to implement a multiple hub design.

Figure 2:
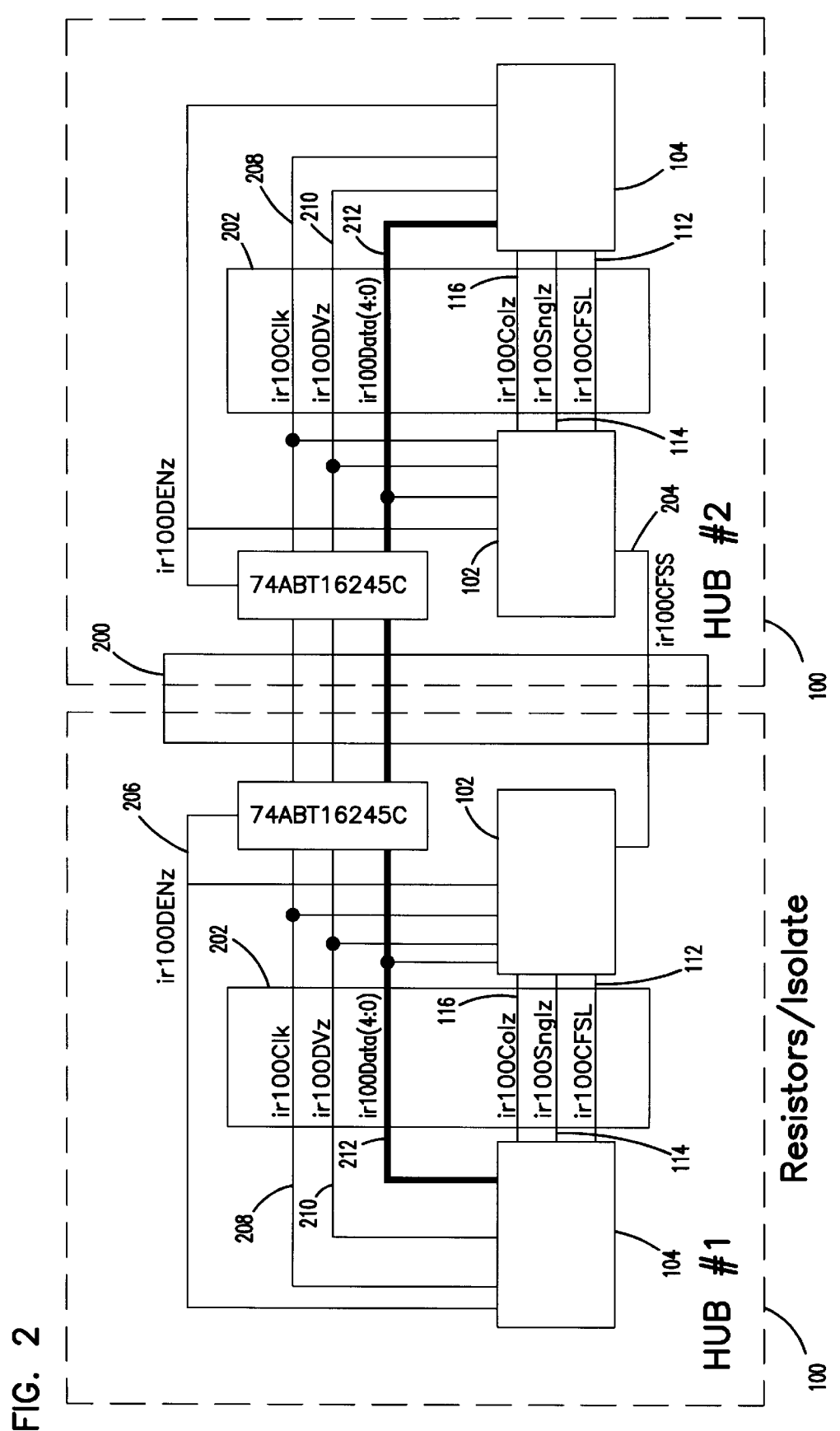
FIG. 2 is a detailed block diagram of an exemplary embodiment of the present invention.

FIG. 2 is a block diagram of an exemplary embodiment of the present invention, showing how multiple repeaters can be cascaded together and still operate in the same collision domain. Two backplanes are defined, a local backplane 202 and a stack backplane 200. The local backplane 202 connects multiple receivers 104, 102 within the same hub 100. The stack backplane 200 connects the multiple hub boxes together, thereby reducing the capacitance each circuit needs to drive for proper operation. Local backplane specific signals 112, 114, and 116 interconnect repeaters 102 and 104 are defined according to Table 1.

Stack specific backplane signals include the ir100CFSS signal, which interconnects supervisory repeaters 102, and is defined according to Table 2.

Four signals are common to the stack backplane 200 and the local backplane 202. They are defined according to Table 3.

The present invention uses relationships between the ir100CFSL 112, ir100CFSS 204, ir100SNGLz 114, and ir100Colz 116 signals to communicate information between repeaters in different hubs. The ir100CFSL signal 112 is driven by either the supervisory 112 or the non-supervisory repeaters 104, to reflect the status of the local backplane 202 only. In response to the ir100CFSL signal 112, the supervisory repeater 102 drives the ir100CFSS signal 204, indicating that a non-supervisory repeater 102 104 or a supervisory repeater 102 is receiving data or has experienced a collision. There is only one ir100CFSS stack driver per hub 100. The ir100CFSS signal 204, common to all hubs via the supervisory repeaters 204, indicates the collision/data state of the system.

The system information is communicated back to each repeater 102, 104 by the supervisory repeater 102. Using the ir100CFSS signal 204, the supervisory repeater 102 translates the system information to all of the non supervisory repeaters 104 in each hub 100 by appropriate selection of the ir100Colz signal 116 and the ir100SNGLz signal 114.

This process is summarized in Table 4.

Figure 3:
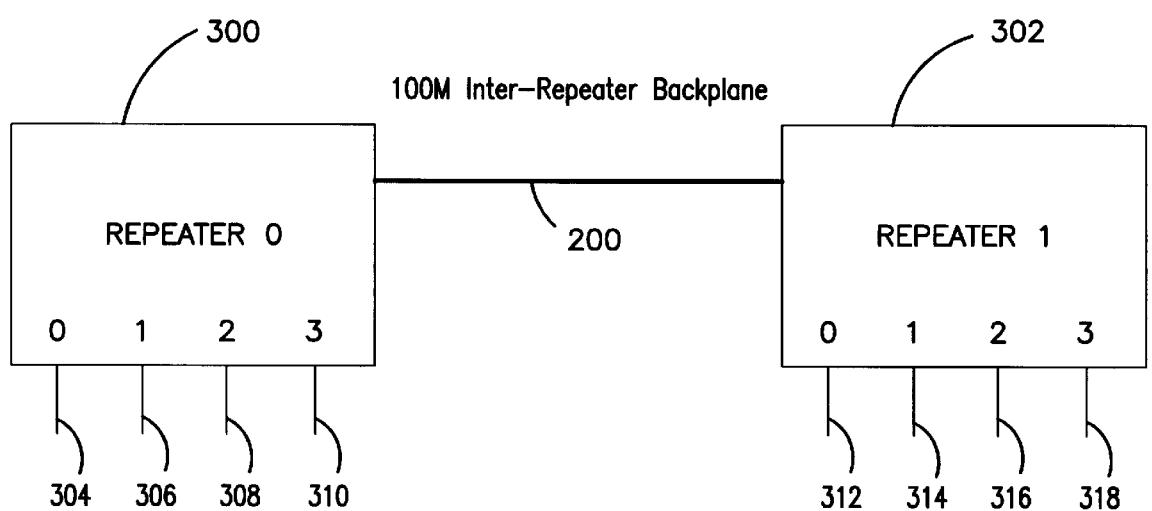
FIG. 3 is a generalized representation of a first repeater and a second repeater in different hubs that are coupled via a stack backplane.

FIG. 3 is a generalized representation of a first repeater 300 and a second repeater 302, both in different hubs and coupled via a stack backplane 200. Repeaters 300, 302 transceive data via repeater I/O ports 304–318. When no data is being received by any of the repeaters in the network, the ir100Clk, ir100DVz, and ir100Data(4:0) signals are inactive. Since no data is being received, ir100CFSL is not driven by either the first repeater 300 or the second repeater 302. Likewise, ir100CFSS is not driven by any of the repeaters, and as a result ir100SNGLz and ir100Colz are both logically high, indicating that there is no carrier to both repeaters 300 and 302.

When data were received by a repeater (for illustrative purposes, the second repeater 302 at I/O port) the state of the backplane signals changes as described in Table 5.

In summary, the ir100Data(4:0) 212 signal is supplied with packet data, the ir100Clk signal 208 is supplied with a 25 MHz clock, and the ir100DVz signal 210 is asserted logically low. The ir100CFSL signal 112 is driven with to indicate that a single packet is being transceived by repeater 302. The ir100CFSS signal 204 is asserted by the first repeater 302, thereby communicating its state to the first repeater 300, which communicates system status to other repeaters in the hub by asserting the ir100SNGLz 114 and ir100Colz 116 signals to '0' and '1' respectively. When the data transmission is completed, all of the above signals are reasserted to system inactive values.

FIG. 4 is a flow chart describing the method steps performed to practice the present invention. First, the repeater state is signaled on a first local signal line. This is indicated in block 400. The signal state indicates whether carrier or a collision is present. Next, in block 402, this signal state information is translated by the supervisory repeater into hub state information. Then, the hub state information (whether there was a carrier or a collision was detected by any repeaters in the hub) is signaled on a single global line to all hubs via each hub's supervisory repeater. This is indicated in block 404. Next, the signaled hub state information is translated into global state information by the supervisory repeaters, and signaled on a second global signal line interconnecting the repeaters in each hub. These steps are depicted in blocks 406 and 408, respectively.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

TABLE 1

| Signal | Direction | Description |
| --- | --- | --- |
| irCFSL (112) | Input/Output | Carrier Force Sense. This analog signal is used by the repeaters to detect collisions and carrier. This signal only reflects the state of the local hub box, not of the whole segment. |
| irSnglz (114) | Input/Output | Single Driver Signal. This signal is asserted when only one packet is being received. This signal is driven by only one repeater per hub box (either chip id 000 or 001). This signal is active low |
| irColz (116) | Input/Output | Collision Signal. This signal is asserted when the segment is experiencing a collision. This signal is driven by only one repeater per hub box (either chip id 000 or 001). This signal is active low. |

TABLE 2

| Signal | Direction | Description |
| --- | --- | --- |
| irCFSS (204) | Input/Output | Carrier Force Sense. This analog signal is used by the repeaters to detect collisions and carrier. |

TABLE 2-continued

| Signal | Direction | Description |
| --- | --- | --- |
|  |  | This signal reflects the state of the whole segment |

TABLE 3

| Signal | Direction | Description |
| --- | --- | --- |
| ir100Clk (208) | Input/Output | This is the backplane's clock signal. |
| ir100DVz (210) | Input/Output | Data valid. This is the framing signal for the data on ir100Data. It is equivalent to the data valid signal on the MII interface. This is active low. |
| ir100Data (4:0) (212) | Input/Output | 5-Bit Symbol Data Lines. These symbols are synchrounous to the ir100Clk signal |
| ir100Denz (206) | Output | Driver enable signal. This signal can be used to enable an external driver. It is active low |

TABLE 4

| | Operation/Rule |
| --- | --- |
| 1 | ir100CFSL (112) reflects status of local system only |
| 2 | When there is a data collision or a carrier, ir100CFSL (112) drives ir100CFSS (204) |
| 3 | Only 1 CFSS driver per local system (chipid 000 or 111) |
| 4 | The supervisory repeater 102 drives ir100CFSS (204). Ir100CFSS (204) reflects the correct state of the system |
| 5 | Based on ir100CFSS (204), the supervisory repeater 102 drives ir100Snglz (114) and ir100Colz (116), indicating system state |
| 6 | ir100Snglz/ir100Colz (114, 116) show ir100CFSS status |
| 7 | All repeaters use ir100Snglz/ir100Colz (116, 114) to determine system status |

TABLE 5

| Signal Name | System Inactive | Repeater Receiving Data | System Inactive |
| --- | --- | --- | --- |
| ir100Clk (206) | Inactive | 25M Clock | Inactive |
| ir100DVz (210) | Inactive | '0' | Inactive |
| ir100Data (4:0) (212) | Inactive | Packet Data | Inactive |
| ir100CFSL (112) | No_Driver | Single Packet | No_Driver |
| ir100Snglz (114) | '1' | '0' | '1' |
| ir100Colz (116) | '1' | '1' | '1' |
| ir100CFSS (204) | No_Driver | Single Packet | No_Driver |

What is claimed is:

1. A method of monitoring data flow in a communications network, wherein the communications network comprising a plurality of hubs, each of the hubs comprising a plurality of repeaters, at least one of which is a supervisory repeater, the method comprising:

(a) transmitting repeater state information between the repeaters within a hub on a first local signal line interconnecting only the repeaters within the hub, the repeater state information indicating whether a repeater in the hub is transmitting data;

(b) translating the repeater state information into hub state information which indicates whether any repeater in the hub is transmitting data and whether a data collision between the repeaters in the hub has occurred;

(c) transmitting the hub state information between the supervisor repeaters on a global signal line interconnecting each supervisory repeater of each of the hubs;

(d) translating the hub state information into global state information which indicates whether any repeater in the hub is transmitting data and whether a data collision between the repeaters in any hub has occurred; and (e) transmitting the global state information between the repeaters within each hub on a second local signal line interconnecting only the repeaters within each hub.

2. The method of claim 1, wherein the repeater state information is transmitted by changing a voltage on the first local signal line.

3. The apparatus of claim 2, wherein the voltage on the first local signal line is changed by sinking a current from the first local signal line through the repeater transmitting the repeater state information.

4. The method of claim 1, wherein the hub state information is transmitted by changing a voltage on the global signal line.

5. The method of claim 4, wherein the voltage on the global signal line is changed by sinking a current from the global signal line through the supervisory repeater transmitted the hub state information.

6. The method of claim 1, wherein the repeaters within each hub are interconnected by a third local signal line, and the global state information is transmitted to the repeaters by applying a voltage to the second and third local signal lines according to whether a repeater in the network is transmitting and whether a data collision in the network has occurred.

7. An apparatus for monitoring data flow in a communications network, wherein the communications network comprises a plurality of hubs, each of the hubs comprises a plurality of repeaters, at least one of which is a supervisory repeater, the apparatus comprising:

(a) means for transmitting repeater state information between repeaters on a first local signal line that interconnects only the repeaters within each hub, the repeater state information indicating whether any repeater in the hub is transmitting data and whether a data collision between the repeaters in the hub has occurred;

(b) means for translating the repeater state information into hub state information, the hub state information indicating whether any repeater in the hub is transmitting data and whether a data collision between the repeaters in the hub has occurred;

(c) means for transmitting the hub state information between supervisory repeaters on a global signal line interconnecting each supervisory repeater;

(d) means for translating the hub state information into global state information which indicates whether any repeater in the hub is transmitting data and whether a data collision between the repeaters in any hub has occurred; and (e) means for transmitting the global state information between the repeaters within each hub on a second local signal line interconnecting only the repeaters within each hub.

8. The apparatus of claim 7, wherein the repeater state information is transmitted by changing a voltage on the first local signal line.

9. The apparatus of claim 8, wherein the voltage on the first local signal line is changed by sinking a current from the first local signal line through the repeater transmitting the repeater state information.

10. The apparatus of claim 7, wherein the hub state information is transmitted by changing a voltage on the global signal line.

11. The apparatus of claim 10, wherein the voltage on the global signal line is changed by sinking a current from the global signal line through the supervisory repeater transmitting the hub state information.

12. The apparatus of claim 7, wherein the repeaters within each hub are interconnected by a third local signal line, and the global state information is transmitted to the repeaters by applying a voltage to the second and third local signal lines according to whether a repeater in the network is transmitting and whether a data collision in the network has occurred.

13. A communications network, comprising:

a plurality of hubs interconnected by a global signal line;

each hub comprising a plurality of non-supervisory repeaters and at least one supervisory repeater;

the non-supervisory repeaters being coupled to the global signal line, a first local signal line, and a second local signal line;

the supervisory repeaters being coupled to the first local signal line and the second local signal line;

the supervisory repeaters and non-supervisory repeaters within each hub communicating repeater state information to the supervisory repeaters within the hub over the first local signal line;

the supervisory repeaters generating hub state information from the repeater state information received from the supervisory repeaters and non-supervisory repeater within each hub;

the supervisory repeaters transmitting the hub state information on a global signal line;

the supervisory repeaters generating global state information from the hub state information received from the supervisory repeaters within each hub; and the supervisory repeaters transmitting the global state information on the second local signal line interconnecting only the repeaters within each hub, the global state information being transmitted on a third local signal line interconnecting the repeaters within each hub according to whether a repeater in the network is transmitting and whether a data collision in the network has occurred.

* * * * *